(12) United States Patent
Kunniyur et al.

(10) Patent No.: US 8,913,585 B2
(45) Date of Patent: Dec. 16, 2014

(54) METHOD AND SYSTEM FOR PROVIDING IMS SESSION CONTINUITY TO A USER EQUIPMENT ACROSS A PLURALITY OF COMMUNICATION NETWORKS

(75) Inventors: Srisankar S. Kunniyur, Chennai (IN); Ali Irfan, Northbrook, IL (US)

(73) Assignee: Motorola Mobility LLC, Libertyville, IL (US)

( * ) Notice: Subject to any disclaimer, the term of this patent is extended or adjusted under 35 U.S.C. 154(b) by 944 days.

(21) Appl. No.: 12/526,545

(22) PCT Filed: Jun. 17, 2008

(86) PCT No.: PCT/US2008/067189
§ 371 (c)(1),
(2), (4) Date: Aug. 10, 2009

(87) PCT Pub. No.: WO2009/006012
PCT Pub. Date: Jan. 8, 2009

(65) Prior Publication Data
US 2010/0085914 A1    Apr. 8, 2010

(30) Foreign Application Priority Data
Jun. 28, 2007    (IN) .......................... 1387/DEL/2007

(51) Int. Cl.
*H04W 4/00*    (2009.01)
*H04L 29/06*    (2006.01)

(52) U.S. Cl.
CPC ........ *H04L 65/1016* (2013.01); *H04L 65/1073* (2013.01); *H04L 65/80* (2013.01); *H04L 65/1083* (2013.01)
USPC ........................................................ 370/331

(58) Field of Classification Search
USPC ................................................. 370/328, 331
See application file for complete search history.

(56) References Cited

U.S. PATENT DOCUMENTS 6,681,108 B1 *  1/2004  Terry et al. .................. 455/412.2
7,746,836 B2 *  6/2010  Jentz et al. .................... 370/338
(Continued)

FOREIGN PATENT DOCUMENTS

FR    WO2006103280    *    3/2006
WO    2008048753 A1         4/2008

OTHER PUBLICATIONS

"Digital cellular telecommunications system (Phase 2+); Universal Mobile Telecommunications System (UMTS); Numbering, addressing and identification (3GPP TS 23.003 version 7.7.0 Release 7); ETSI TS 123 003" ETSI Standards, Lis, Sophia Antipolis Cedex, France, vol. 3-CN2; 3-CN4, No. V7.7.0, Apr. 1, 2008, all pages.

(Continued)

*Primary Examiner* — Shaq Taha
(74) *Attorney, Agent, or Firm* — Byrne Poh LLP (57) ABSTRACT

A method and system for providing IP Multi-media Subsystem (IMS) session continuity to a User Equipment (UE) across a plurality of communication networks is provided. The UE traverses from a first communication network to a second communication network. A public user identity associated with a private user identity of the UE is registered with the first communication network by using a first address. The method includes generating (404) a complimentary private user identity associated with the public user identity. The method also includes obtaining (406) a second address from the second communication network when the UE traverses from the first communication network to the second communication network. Moreover, the method includes registering (408) the public user identity associated with the complimentary private user identity with the first communication network by using the second address.

20 Claims, 6 Drawing Sheets

(56) References Cited

U.S. PATENT DOCUMENTS

| | | |
|---|---|---|
| 2003/0040280 A1 | 2/2003 | Koskelainen |
| 2004/0122934 A1* | 6/2004 | Westman et al. ............. 709/223 |
| 2005/0025164 A1 | 2/2005 | Kavanagh et al. |
| 2005/0117556 A1 | 6/2005 | Lee et al. |
| 2006/0140143 A1* | 6/2006 | Bauer ........................... 370/328 |
| 2007/0060097 A1* | 3/2007 | Edge et al. ................. 455/404.1 |
| 2007/0280154 A1* | 12/2007 | Gupta et al. .................. 370/328 |
| 2008/0080480 A1* | 4/2008 | Buckley et al. ............... 370/352 |
| 2008/0123625 A1* | 5/2008 | Buckley ........................ 370/352 |
| 2009/0059829 A1* | 3/2009 | Bachmann et al. ........... 370/311 |
| 2009/0213808 A1* | 8/2009 | Boehm et al. ................. 370/331 |

OTHER PUBLICATIONS

"Universal Mobile Telecommunications System (UMTS); Security aspects of early IP Multimedia Subsystem (IMS) (3GPP TR 33.978 version 6.6.0 Release 6); ETSI TR 133 978" ETSI Standards, Lis, Sophia Antipolis Cedex, France, vol. 3-SA3, No. V6.6.0 Dec. 1, 2006, all pages.

Shacham, R. et al.: "Session Initiation Protocol (SIP) Session Mobility", draft-shacham-sipping-session-mobility-00, Internet—Draft Expires: Aug. 18, 2005, Feb. 14, 2005, all pages.

* cited by examiner

METHOD AND SYSTEM FOR PROVIDING IMS SESSION CONTINUITY TO A USER EQUIPMENT ACROSS A PLURALITY OF COMMUNICATION NETWORKS

This invention generally relates to communication networks, and more specifically, to a method and system for providing IMS session continuity to a User Equipment (UE) across a plurality of communication networks.

BACKGROUND OF THE INVENTION

In recent years, there has been an exponential increase in the use of User Equipment (UEs) such as mobile phones, Personal Digital Assistants (PDAs), pagers, Palmtops™, and laptops. Data transfer or information exchange can be enabled between one or more UEs through a communication network. Examples of a communication network include, but are not limited to, Universal Mobile Telecommunications System (UMTS) networks, General Packet Radio Service (GPRS) networks, Code Division Multiple Access (CDMA) 2000 networks, Worldwide Interoperability for Microwave Access (WiMAX) networks, Digital Subscriber Line (DSL) networks, Wireless Fidelity (WiFi) networks, and cable networks. Some communication networks use a standardized next-generation networking architecture such as an Internet Protocol Multimedia Subsystem (IMS) that can be employed to offer varied services, for example, Voice-over-Internet Protocol (VoIP) and multimedia services. IMS is a services framework to deliver Internet Protocol (IP)-based services that has been proposed by Third-Generation Partnership Project (3GPP) and adopted with minor changes by other standards bodies such as Third-generation Partnership Project 2 (3GPP2), Cable Labs, and Network Working Group of WiMAX. IMS uses Session Initiation Protocol (SIP) as the underlying session protocol. IMS can facilitate various services and applications on the UE, such as presence services, video conferencing, Push-to-talk Over Cellular (PoC), multiparty gaming, community services, and content sharing.

In IMS, two types of identities are implemented for a user, namely, a public user identity and a private user identity. The private user identity, which uniquely identifies a UE to the network, is assigned to the user by the network and is known only to the network and the user of the UE. The private user identity can be stored in the network in a home subscriber server (HSS) and can be used to identify the user's subscription information, such as the user's security-related information. The private user identity also can be stored permanently in an IP Multimedia Services Identity Module (ISIM), which can be encapsulated within the UE. The user's subscription information maintained by the HSS may include one or more private user identities. In addition, typically the ISIM consists of one private user identity, but more than one private user identity in an ISIM is possible. The user's subscription information also can be associated with one or more public user identities.

The public user identity/identities can be used by the user to enable communication with other users. An example of the public user identity/identities can be a SIP URI (Uniform Resource Identifier). Each private user identity of the user can be associated with multiple public user identities.

When the user registers with a network, using the ISIM in the UE, the public user identity, the private user identity, and the IP address of the UE are transmitted to the network, typically via a register message. The network can then use the private user identity provided in the register message to retrieve security credentials of the user from the subscription information in the HSS and hence can authenticate the user. The network can also create a binding of the user's public user identity to an IP address of the UE. This binding information then is used by the network to forward SIP messages to the user's UE based on the user's public user identity. If the UE's IP address changes, for example, when the UE traverses across communication networks, the UE is required to re-register with the network using the new IP address. Typically, the UE sends the same private user identity in the re-registration as the UE had used in the initial registration. On this re-registration, the network removes the older binding of the public user identity and the old IP address and creates a new binding of the public user identity to the new IP address.

The removal of the older binding and creation of a new binding disrupts any ongoing session with the old IP address. Hence, the change in the local IP address can completely disrupt ongoing IMS sessions such as an active call, an instant messaging service, a Bluetooth™ transfer session, a web-browsing service, and a video-streaming service on the UE. Such disruptions greatly impact the user's experience of such services. Therefore, there is a need for a method and system that will enable seamless continuity of IMS sessions when the UE moves across communication networks.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of embodiments of the present invention.

DETAILED DESCRIPTION

Before describing in detail the particular method and system for providing Internet Protocol Multimedia Subsystem (IMS) session continuity to a User Equipment (UE) across a plurality of communication networks in accordance with the present invention, it should be observed that the present invention resides primarily in combinations of method steps related to providing IMS session continuity to a UE across a plurality of communication networks. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article or apparatus that comprises the element.

The term "another," as used in this document, is defined as at least a second or more. The terms "includes" and/or "having," as used herein, are defined as comprising. The terms "including" and/or "having," as used herein, are defined as comprising. The term "coupled," as used herein with reference to electro-optical technology, is defined as connected, although not necessarily directly, and not necessarily mechanically. The term "program," as used herein, is defined as a sequence of instructions designed for execution on a computer system. A "program" or "computer program" may include a subroutine, a function, a procedure, an object method, an object implementation, an executable application, an applet, a servlet, a source code, an object code, a shared library/dynamic load library and/or other sequence of instructions designed for execution on a computer system.

In one embodiment of the present invention, a method for providing IMS session continuity to a User Equipment (UE) across a plurality of communication networks is disclosed. The UE traverses from a first communication network to a second communication network. The method includes generating a complimentary private user identity (CPI) associated with a public user identity. In turn, the public user identity is associated with a private user identity. The public user identity associated with the private user identity is registered with the first communication network by using a first address. A second second address is obtained from the second communication network when the UE traverses from the first communication network to the second communication network. The public user identity associated with the CPI is registered with the second communication network by using the second address.

In another embodiment of the present invention, a UE is disclosed. The UE includes a receiver and a processor. The receiver is capable of receiving at least one address from a plurality of communication networks. The processor is capable of generating a complimentary private user identity (CPI) associated with a public user identity. The public user identity is also associated with a private user identity and is registered with a first communication network by using a first address.

Figure 1:
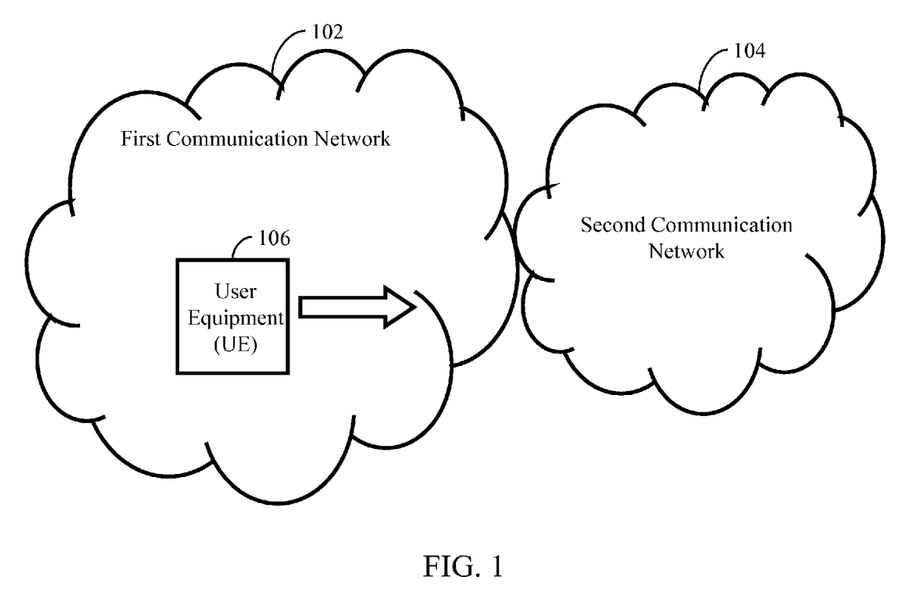
FIG. 1 illustrates an exemplary environment where various embodiments of the present invention can be practiced.

FIG. 1 illustrates an exemplary environment where various embodiments of the present invention can be practiced. For the purpose of this description, FIG. 1 is shown to include a first communication network 102, a second communication network 104, and a User Equipment (UE) 106. An example of the UE 106 includes, but is not limited to, be a mobile phone, a wireless-enabled laptop, a wireless-enabled Personal Digital Assistant (PDA), a pager, and a wireless-enabled Palmtop™. Further, an example of a communication network, such as communication networks 102 and 104, includes, but is not limited to, Universal Mobile Telecommunications System (UMTS) networks, General Packet Radio Service (GPRS) networks, Code Division Multiple Access (CDMA) 2000 networks, Worldwide Interoperability for Microwave Access (WiMAX) networks, Digital Subscriber Line (DSL) networks, Wireless Fidelity (WiFi) networks, cable networks, and a 3G or a 4G network. However, it will be apparent to a person skilled in the art that an exemplary communication network can include more than two communication networks and one or more UEs. The UE 106 is capable of operating in each of the communication networks 104 and 106. Further, for the purpose of this description and as well as for clarity, the UE 106 is shown to traverse from the first communication network 102 to the second communication network 104. Further, for the purpose of this description, the first communication network 102 is a home IMS network and the second communication network 104 is a visited IMS network. The home network of a user is the network where the security credentials of the user are stored. The UE 106 is associated with two kinds of identities, namely a public user identity and a private user identity. The public user identity is associated with the private user identity and is registered in association with a first address with the first communication network 102 (the home IMS network of the UE 106). An example of the first address can be an Internet Protocol (IP) address. When the UE 106 traverses from the first communication network 102 to the second communication network 104, the UE 106 re-registers the public user identity associated with a complementary private user identity with the first communication network 102 using a second address.

FIG. 1 has been explained with the first communication network 102 being the home IMS network for the UE 106. In another embodiment of the present invention, a third communication network (not shown in FIG. 1) can be the home IMS network for the UE 106 and the first communication network 102 and the second communication network 104 can each be a visited IMS network for the UE 106. It would be apparent to those skilled in the art that the UE 106 always registers with home IMS network using an IP address. In such a scenario, the public user identity associated with the private user identity is registered at the first address with the third communication network. Thereafter, when the UE 106 traverses from the first communication network 102 to the second communication network 104, the UE 106 re-registers the public user identity associated with a complementary private user identity with the third communication network using the second address.

Figure 2:
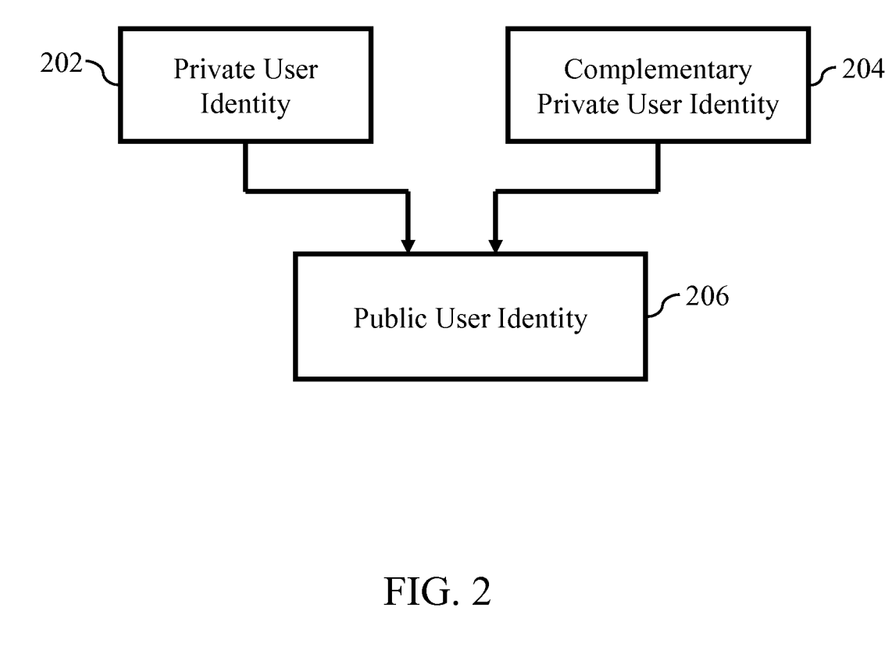
FIG. 2 is a block diagram illustrating an exemplary association between a private user identity, an associated complimentary private user identity and a public user identity in accordance with an embodiment of the present invention.

FIG. 2 is a block diagram illustrating an exemplary association between a private user identity 202, a complimentary private user identity 204, and a public user identity 206 in accordance with an embodiment of the present invention. The private user identity 202, the complimentary private user identity 204, and the public user identity 206 are associated with the UE 106. The private user identity 202 is an identifier that uniquely identifies the UE 106 and is assigned by the first communication network 102. The complimentary private user identity 204 can be generated for the private user identity 202. The complimentary private user identity 204 can be created simultaneously with the private user identity 202. In an embodiment of the present invention, the complimentary private user identity 204 has the same service profile and associations as the private user identity. In another embodiment of the present invention, the complimentary private user identity 204 can be generated in a home subscriber server (HSS) and an IP Multimedia Services Identity Module (ISIM).

The public user identity 206 associated with the private user identity 202 is registered by using a first IP address with the first communication network 102 (the home IMS network of the UE 106, as explained in FIG. 1). When the UE 106 traverses from the first communication network 102 to the second communication network 104, the public user identity 206 associated with the complimentary private user identity 204 can be registered by using a second address with the first communication network 102. Further, the public user identity 206 associated with the private user identity 202 can be de-registered with the first communication network 102. When the UE 106 traverses from the first communication network 102 to the second communication network 104 during an ongoing data session, the complimentary private user identity 204 can enable the continuity of the data session in the second communication network 104. One or more complimentary private user identities can be generated for the private user identity 202, for example, a first complimentary private user identity and a second complimentary private user identity. When the UE 106 traverses across a plurality of communication networks, the one or more complimentary private identities can ensure the continuity of the data session across the plurality of communication networks.

Figure 3:
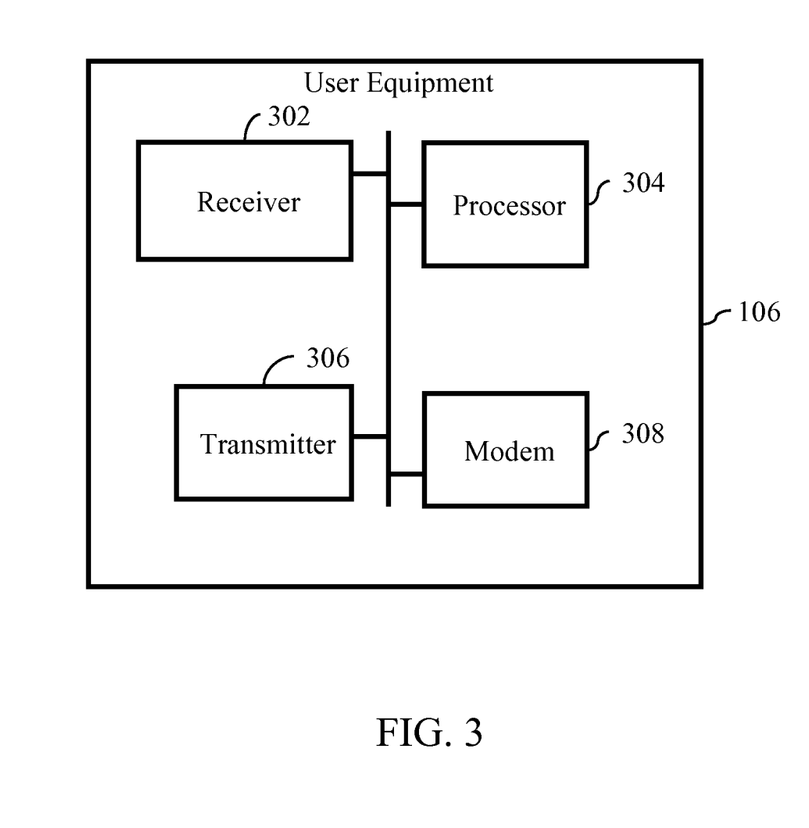
FIG. 3 is a block diagram illustrating a User Equipment (UE) in accordance with an embodiment of the present invention.

FIG. 3 is a block diagram illustrating the UE 106 in accordance with an embodiment of the present invention. The UE 106 includes a receiver 302, a processor 304, a transmitter 306, and a modem 308. The receiver 302 is capable of receiving at least one address from a plurality of communication networks. The public user identity 206 associated with the UE 106 can be registered with a communication network of the plurality of communication networks by using the at least one address. The processor 304 is capable of internally generating the complimentary private user identity 204 associated with the public user identity 206. In an embodiment of the present invention, the complimentary private user identity 204 can be allocated to the UE by the first communication network 102. In another embodiment of the present invention, the service profile and associations of the complimentary private user identity 204 and the private user identity 202 can be similar. When the UE 106 traverses from the first communication network 102 to the second communication network 104, the public user identity 206 associated with the complimentary private user identity 204 can be registered with the first communication network 102 (the home IMS network of the UE 106, as explained in FIG. 1).

The transmitter 306 is capable of transmitting the complimentary private user identity 204 to the first communication network 102 to register the public user identity 206 associated with the complimentary private user identity 204. For an embodiment, the complimentary private user identity 204 is transmitted to the first communication network 102 when the UE 106 traverses from the first communication network 102 to the second communication network 104. The complimentary private user identity 204 can enable the continuity of a data session when the UE 106 travels from the first communication network 102 to the second communication network 104. The modem 308 can enable the UE 106 to communicate with the first communication network 102 and the second communication network 104 simultaneously for a predetermined time interval. In an embodiment of the present invention, the predetermined time interval can be a handoff period of the UE 106 when moving from the first communication network 102 to the second communication network 104.

Figure 4:
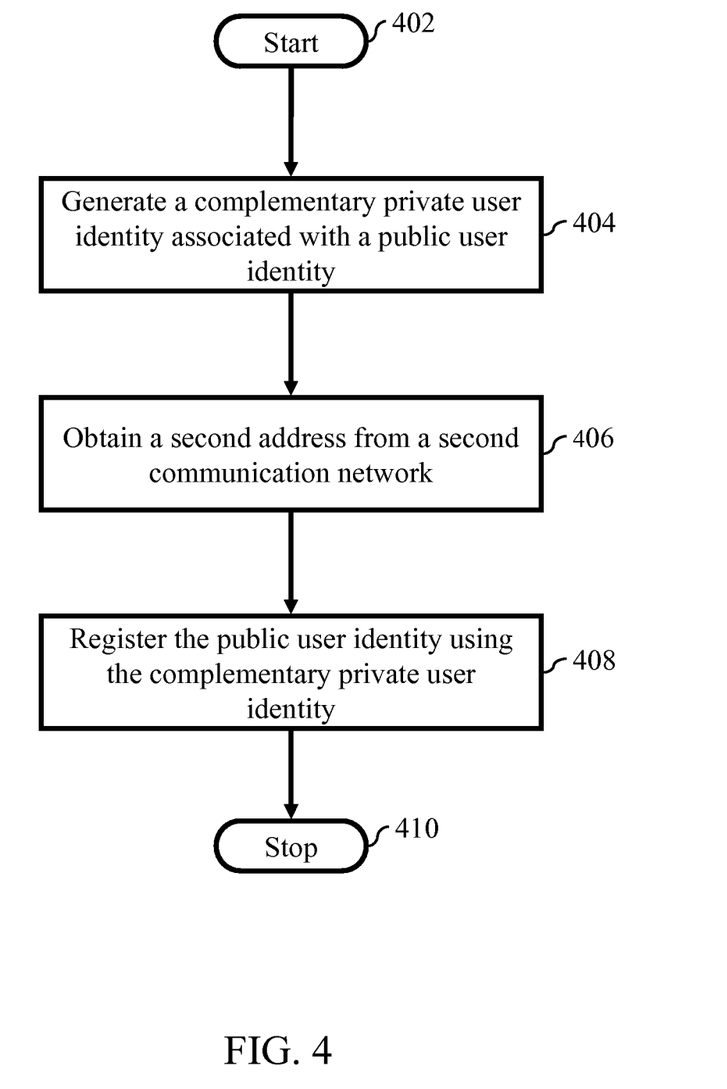
FIG. 4 is a flow diagram illustrating a method for providing Internet Protocol Multimedia Subsystem (IMS) session continuity to a UE across a plurality of communication networks in accordance with an embodiment of the present invention.

FIG. 4 is a logic flow diagram illustrating a method for providing IMS session continuity to the UE 106 across a plurality of communication networks in accordance with an embodiment of the present invention. The method is initiated at step 402. When the UE 106 is present in the first communication network 102, the public user identity 206 associated with the private user identity 202 can be registered with the first communication network 102 (the home IMS network of the UE 106, as explained in FIG. 1) by using a first address. At step 404, the complimentary private user identity 204 associated with the public user identity 206 is generated. In an embodiment of the present invention, the complimentary private user identity 204 can be generated by the processor 304 of the UE. In another embodiment of the present invention, the complimentary private user identity 204 can be allocated to the UE 106 by the first communication network 102 and can be stored in a home subscriber server (HSS) associated with the first communication network.

At step 406, a second address is obtained by UE 106 from the second communication network 104 when the UE traverses from the first communication network 102 to the second communication network 104. At step 408, the public user identity 206 associated with the complimentary private user identity 204 is registered by UE 106 with the first communication network 102 by using the second address when the UE 106 enters the second communication network 104. In the second communication network 104, the complimentary private user identity 204 can act as the private user identity of the public user identity 206. As a result, session continuity can be enabled by using the complimentary private user identity 204. In another embodiment of the present invention, the public user identity 206 associated with the private user identity 202 of the UE 106 is registered with the first communication network by using a third address obtained by UE 106 from the third communication network when the UE 106 traverses from the second communication network 104 to the third communication network. The continuity of the session on the UE 106 can be enabled by using the public user identity 206 associated with the private user identity 202 in the third communication network. Thereafter, the method is terminated at step 410.

Figure 5:
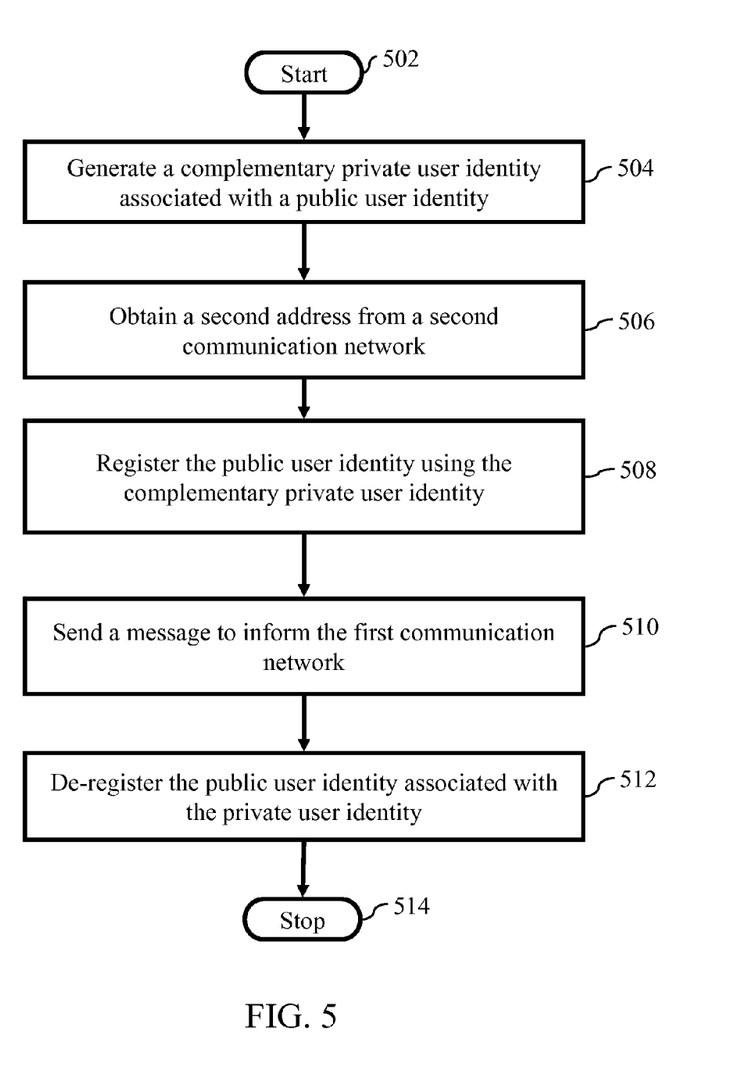
FIG. 5 is a flow diagram illustrating a method for providing IMS session continuity to a UE across a plurality of communication networks in accordance with another embodiment of the present invention.

FIG. 5 is a logic flow diagram illustrating a method for providing IMS session continuity to the UE 106 across a plurality of communication networks in accordance with another embodiment of the present invention. At step 502, the method for providing IMS session continuity to the UE 106 across a plurality of communication networks is initiated. The public user identity 206 associated with the private user identity 202 is registered by UE 106 with the first communication network 102 (the home IMS network of the UE 106, as explained in FIG. 1) by using a first address. At step 504, a complimentary private user identity 204 associated the public user identity 206 is generated. In an embodiment of the present invention, the complimentary private user identity 204 can be generated by the processor 304 of the UE. In another embodiment of the present invention, the complimentary private user identity 204 can be allocated to the UE 106 by the first communication network 102. At step 506, a second address is obtained from the second communication network 104 by the receiver 302 of the UE. At step 508, the public user identity 206 associated with the complimentary private user identity 204 is registered by UE 106 with the first communication network 102 by using the second address when the UE traverses from the first communication network 102 to the second communication network 104. At step 510, a message can be sent to the first communication network 102 to communicate to the first communication network 102 that the UE 106 is traversing from the first communication network 102 to the second communication network 104. In an embodiment of the present invention, the message can be a REPLACES SIP message, which can replace one participant with another during an ongoing session. The REPLACES SIP message can be used to replace an existing SIP dialog with a new SIP dialog.

At step 512, the public user identity 206 associated with the private user identity 202 is de-registered with the first communication network 102 when session continuity in the second communication network 104 is established, hence enabling seamless session continuity. In another embodiment of the present invention, the message can be a RE-INVITE message. A message sent during an ongoing session can be referred to as a RE-INVITE message. The RE-INVITE message is a Session Initiation Protocol (SIP) message that can be used in an existing session to modify the session. Examples of a modification of a session by use of a RE-INVITE message include, but are not limited to, changing the addresses or ports of the UE 106, adding a media stream, and deleting a media stream. Thereafter, the public user identity 206 associated with the private user identity 202 can be automatically de-registered with the first communication network 102. The de-registering can be based on an implicit time-out mechanism. For example, the implicit time-out mechanism can be the handoff period of the UE 106 from the first communication network 102 to the second communication network 104. Thereafter, the method is terminated at step 514.

Figure 6:
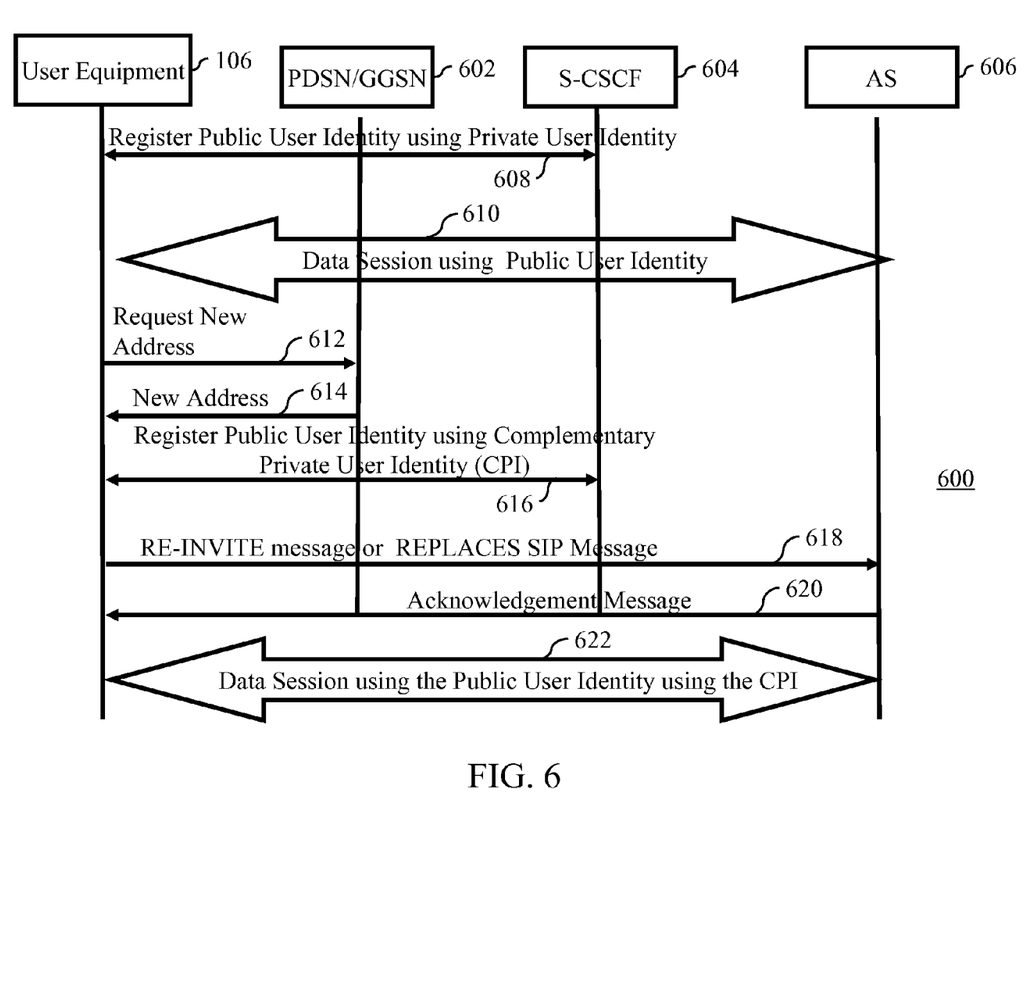
FIG. 6 is a call-flow diagram illustrating a method for providing IMS session continuity to a UE across a plurality of communication networks in accordance with an embodiment of the present invention.

FIG. 6 is a call-flow diagram 600 illustrating a method for providing IMS session continuity to the UE 106 across a plurality of communication networks in accordance with an embodiment of the present invention. The call-flow diagram 600 includes the UE 106, a Packet Data Serving Node/Gateway GPRS Serving Node (PDSN/GGSN) 602, a Serving Call Session Control Function (S-CSCF) 604, and an Application Server (AS) 606. A PDSN is a connection point between a UE and a communication network and is a component of a CDMA 2000 mobile network. Similarly, a GGSN can be a component of a GSM or a UMTS network and can act as a connection point between a UE and a communication network. The S-CSCF 604 is a SIP server and is a central node in the communication network. The functions of the S-CSCF 604 include, but are not limited to, handling SIP registrations, routing services, and enforcing the policies of the network operator. Further, the S-CSCF also handles setting up of SIP sessions, provides SIP session routing, and manages registration and SIP session timers. The AS 606 is a server computer in the communication network that is dedicated to run one or more software applications.

The UE 106 registers the public user identity 206 associated with the private user identity 202 with the first communication network 102 (the home IMS network of the UE 106, as explained in FIG. 1) using the first address 608. An arrow diagram 610 depicts the continuity of the data session of the UE 106 through the public user identity 206 associated with the private user identity 202 when the UE 106 is present in the first communication network 102. When the UE 106 traverses from the first communication network 102 to the second communication network 104, the UE sends a request 612 for a second address to the PDSN/GGSN 602. The PDSN/GGSN 602 then responds to the UE 106 by sending the second address 614 to the UE 106. Thereafter, the UE 106 registers 616 the public user identity 206 associated with the complimentary private user identity 204 of the UE with the first communication network 102 by using the second address 614. The UE 106 then sends at least one of a RE-INVITE message and a REPLACES SIP message 618 to the AS 606.

The AS 606 responds by sending an acknowledgement message 620 back to the UE 106 to acknowledge the receipt of the at least one of the RE-INVITE message and the REPLACES SIP message. Thereafter, the data session is continued with the public user identity 206 associated with the complimentary private user identity 204 in the second communication network, as shown by an arrow diagram 622.

Various embodiments of the present invention provide a method and system for providing IMS session continuity to a UE across a plurality of communication networks. The method can ensure the continuity of IMS data sessions when the UE traverses from one communication network to another. The method can also enable seamless session continuity when the UE traverses across a plurality of communication networks. Further, in various embodiments, the method ensures that only two private identities (private user identity and complimentary private user identity) are required when the UE traverses across a plurality of communication networks.

It will be appreciated that the method and system for providing IMS session continuity to a UE across a plurality of communication networks, described herein, may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power-source circuits, and user-input devices. As such, these functions may be interpreted as steps of a method to enable users to provide IMS session continuity to a UE across a plurality of communication networks. Alternatively, some or all of the functions can be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for providing IP Multimedia Subsystem (IMS) session continuity to a User Equipment (UE) across a plurality of communication networks, the UE moving from a first communication network to a second communication network, the method comprising:

generating, by the UE, a complimentary private user identity associated with a public user identity, wherein the public user identity is further associated with a private user identity, and wherein the public user identity and the private user identity are registered by the UE with the first communication network using a first address;

obtaining, by the UE, a second address from the second communication network when the UE moves from the first communication network to the second communication network;

registering, by the UE, the public user identity with the first communication network using the second address and the complimentary private user identity; and registering the public user identity and the private user identity with the first communication network using a third address when the UE moves from the second communication network to a third communication network.

2. The method as recited in claim 1 further comprising sending a message to inform the first communication network that the UE is moving from the first communication network to the second communication network.

3. The method as recited in claim 1 further comprising de-registering the public user identity and the private user identity registered to the first communication network, wherein the public user identity and the private user identity are registered to the first communication network using the first address.

4. The method as recited in claim 1 further comprising automatically de-registering the public user identity and the private user identity registered to the first communication network, wherein the de-registering is based on a time-out mechanism and wherein the public user identity and the private user identity are registered to the first communication network using the first address.

5. The method as recited in claim 1, wherein service profile and associations of the complimentary private user identity and service profile and associations of the private user identity are similar.

6. The method as recited in claim 1 further comprising:
generating a second complimentary private user identity associated with the public user identity;
obtaining a third address from a third communication network when the UE moves from the second communication network to the third communication network; and
registering the public user identity and the second complimentary private user identity with the third communication network using the third address when the UE moves from the second communication network to the third communication network.

7. A non-transitory computer program product for use in a User Equipment and for providing IP Multimedia Subsystem (IMS) session continuity to the UE across a plurality of communication networks, the UE moving from a first communication network to a second communication network, the computer program product comprising a computer readable medium having a computer readable program code embodied therein for performing a method for providing IP Multimedia Subsystem (IMS) session continuity to the User Equipment (UE) across the plurality of communication networks, the method comprising:

generating, by the computer program product for use in the UE, a complimentary private user identity associated with a public user identity, wherein the public user identity is further associated with a private user identity, and wherein the public user identity and the private user identity are registered by the computer program product for use in the UE with the first communication network using a first address;

obtaining, by the computer program product for use in the UE, a second address from the second communication network when the UE moves from the first communication network to the second communication network;

registering, by the computer program product for use in the UE, the public user identity with the first communication network using the second address and the complimentary private user identity; and registering the public user identity and the private user identity with the first communication network using a third address when the UE moves from the second communication network to a third communication network.

8. A User Equipment (UE) comprising:
a receiver capable of receiving at least one address from a plurality of communication networks; and
a processor capable of generating a complimentary private user identity associated with a public user identity, wherein the public user identity is further associated with a private user identity, and wherein the public user identity and the private user identity are registered by the processor with a first communication network using a first address,
the receiver capable of obtaining a second address from a second communication network when the UE moves from the first communication network to the second communication network,
a transmitter capable of registering the public user identity with the first communication network using the second address and the complimentary private user identity;
the receiver capable of obtaining a third address when the UE moves from the second communication network to a third communication network; and
the transmitter capable of registering the public user identity and the private user identity with the first communication network using the third address when the UE moves from the second communication network to the third communication network.

9. The UE as recited in claim 8, wherein the transmitter is further capable of transmitting the complimentary private user identity to a second communication network when the UE is moving from the first communication network to the second communication network.

10. The UE as recited in claim 8, wherein service profile and associations of the complimentary private user identity and service profile and associations of the private user identity are similar.

11. The UE as recited in claim 8 further comprising a modem, wherein the modem enables the UE to simultaneously communicate with the first communication network and a second communication network for a predetermined time interval.

12. The non-transitory computer program product as recited in claim 7, wherein the method further comprises sending a message to inform the first communication network that the UE is moving from the first communication network to the second communication network.

13. The non-transitory computer program product as recited in claim 7, wherein the method further comprises de-registering the public user identity and the private user identity registered to the first communication network, wherein the public user identity and the private user identity are registered to the first communication network using the first address.

14. The non-transitory computer program product as recited in claim 7, wherein the method further comprises automatically de-registering the public user identity and the private user identity registered to the first communication network, wherein the de-registering is based on a time-out mechanism and wherein the public user identity and the private user identity are registered to the first communication network using the first address.

15. The non-transitory computer program product as recited in claim 7, wherein service profile and associations of the complimentary private user identity and service profile and associations of the private user identity are similar.

16. The non-transitory computer program product as recited in claim 7, wherein the method further comprises:
   generating a second complimentary private user identity associated with the public user identity;
   obtaining a third address from a third communication network when the UE moves from the second communication network to the third communication network; and
   registering the public user identity and the second complimentary private user identity with the third communication network using the third address when the UE moves from the second communication network to the third communication network.

17. The UE as recited in claim 8, wherein the transmitter is further capable of sending a message to inform the first communication network that the UE is moving from the first communication network to the second communication network.

18. The UE as recited in claim 8, wherein the transmitter is further capable of de-registering the public user identity and the private user identity registered to the first communication network, wherein the public user identity and the private user identity are registered to the first communication network using the first address.

19. The UE as recited in claim 8, wherein the transmitter is further capable of automatically de-registering the public user identity and the private user identity registered to the first communication network, wherein the de-registering is based on a time-out mechanism and wherein the public user identity and the private user identity are registered to the first communication network using the first address.

20. The UE as recited in claim 8,
   wherein the processor is further capable of generating a second complimentary private user identity associated with the public user identity;
   wherein the receiver is further capable of obtaining a third address from a third communication network when the UE moves from the second communication network to the third communication network; and
   wherein the transmitter is further capable of registering the public user identity and the second complimentary private user identity with the third communication network using the third address when the UE moves from the second communication network to the third communication network.

* * * * *